April 22, 1952   A. C. MASON   2,593,469
BEAD BLANK FORMING METHOD AND MACHINE
Filed March 22, 1950   3 Sheets-Sheet 1
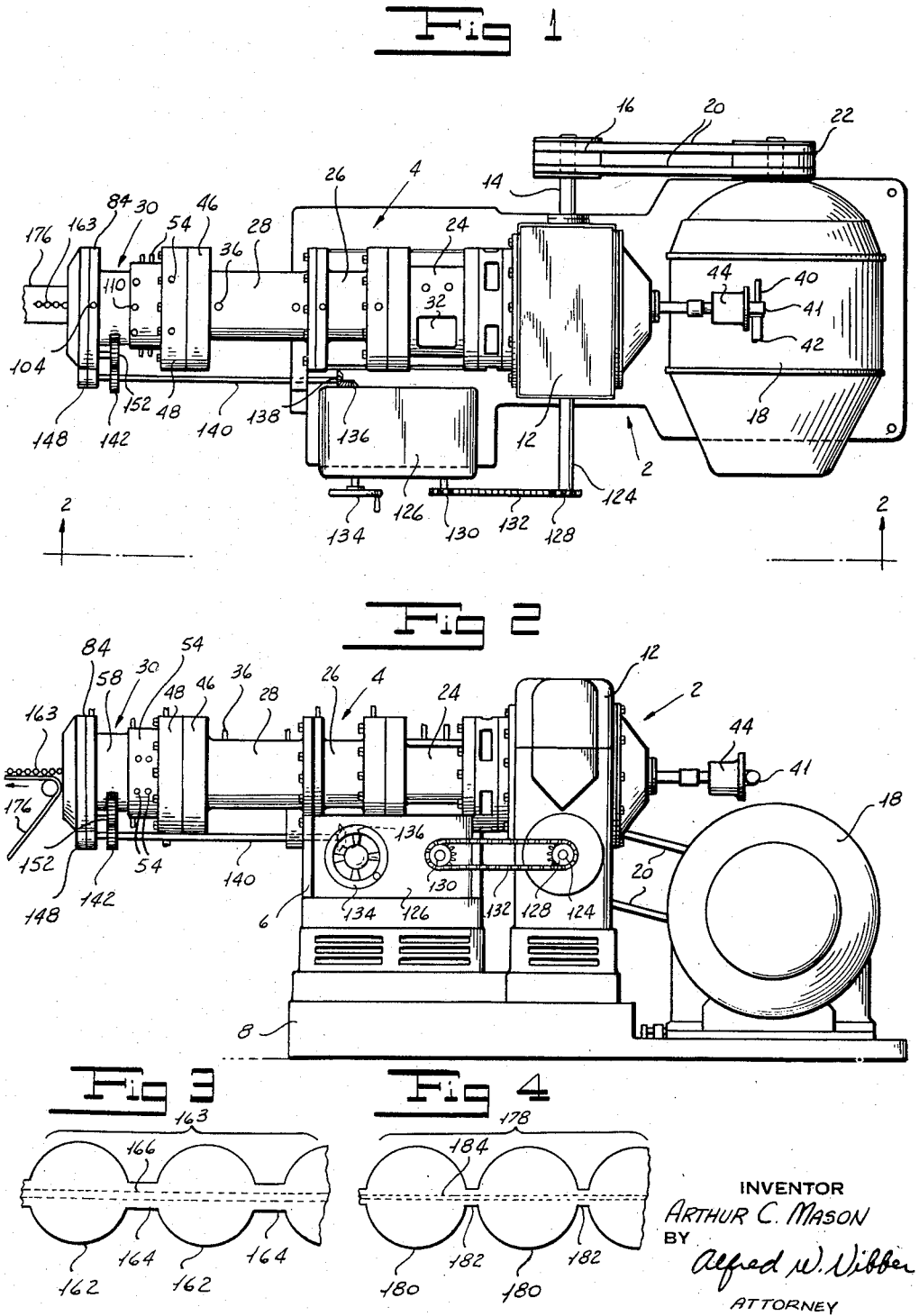
INVENTOR
ARTHUR C. MASON
BY
Alfred W. Nibber
ATTORNEY April 22, 1952          A. C. MASON          2,593,469
BEAD BLANK FORMING METHOD AND MACHINE
Filed March 22, 1950
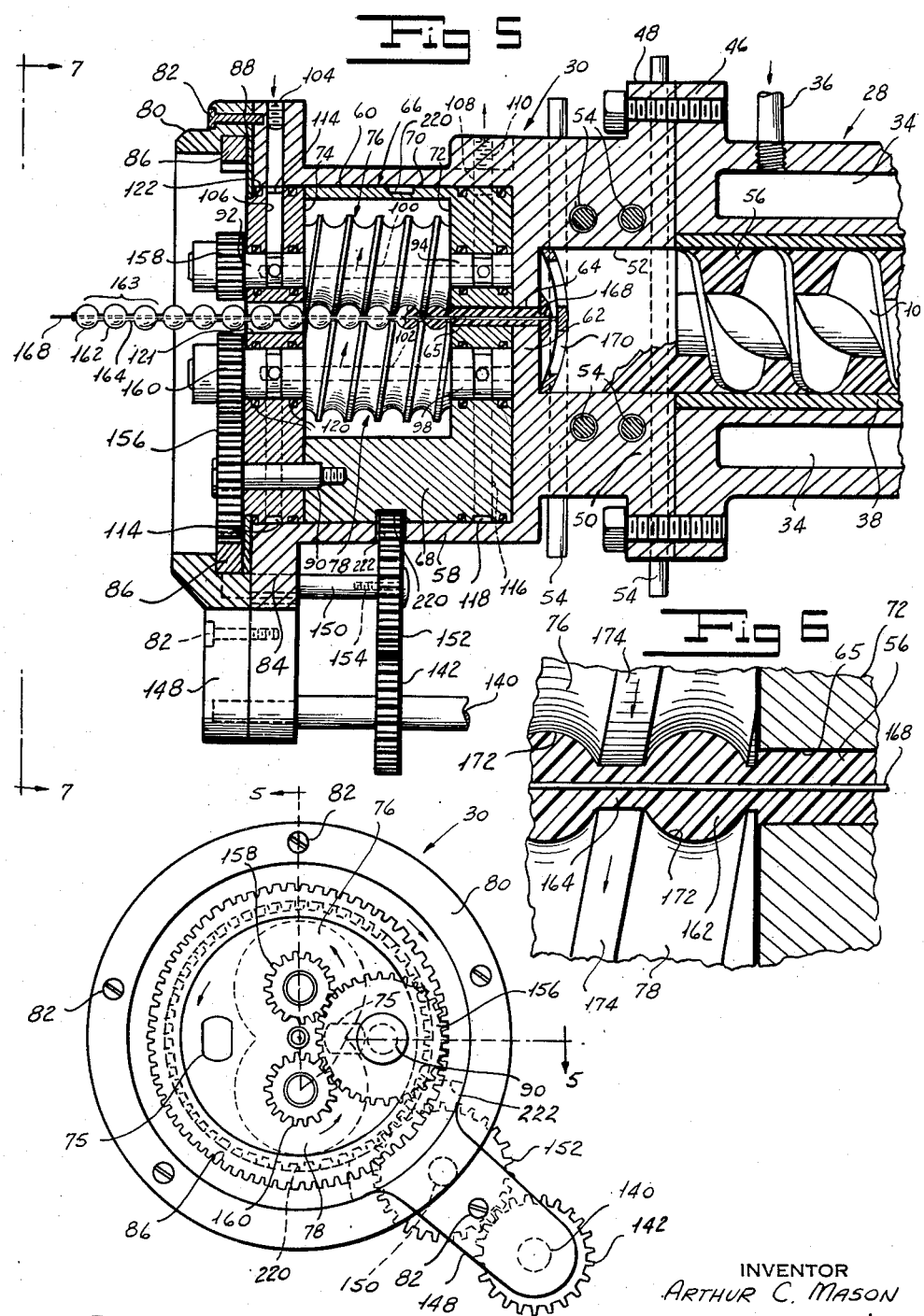
INVENTOR
ARTHUR C. MASON
BY Alfred W. Nibbe
ATTORNEY

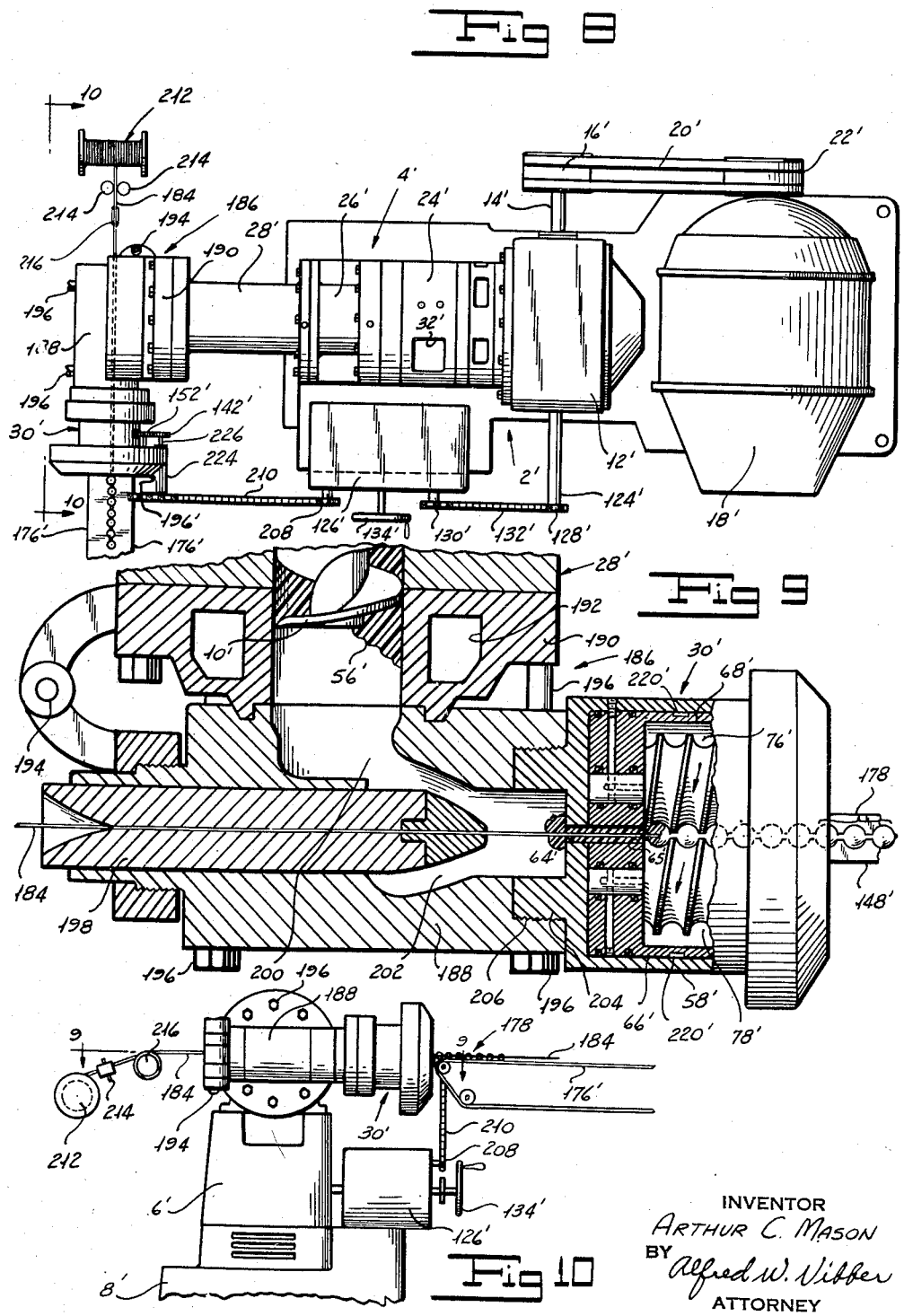

Patented Apr. 22, 1952

2,593,469

UNITED STATES PATENT OFFICE 2,593,469

BEAD BLANK FORMING METHOD AND MACHINE

Arthur C. Mason, Wayne Township, Passaic County, N. J.

Application March 22, 1950, Serial No. 151,237

22 Claims. (Cl. 18—12)

This invention relates to a method of and apparatus for forming elongated articles which have regularly recurring zones of larger and smaller diameter. More particularly, the invention relates to a method of and an apparatus for forming elongated bead blanks by operations involving the extrusion of plastic material into continuously traveling bead forming cavities.

This application is a continuation-in-part of application Ser. No. 145,338, filed February 21, 1950 which has become abandoned.

Beads for the costume jewelry trade have been formed in the past by a step-by-step form-grinding operation performed upon elongated plastic bodies as, for example, heavy walled plastic tubes. In such method the form-grinding apparatus such as that disclosed and claimed in applicant's Patent No. 2,413,880, issued January 7, 1947, has been employed.

Such beads have also been made by continuous grinding operations such as those involving the use of the method and apparatus disclosed and claimed in applicant's Patent No. 2,486,750, issued November 1, 1949, in which elongated plastic bodies have been continuously ground by a centerless grinding machine employing a helically ribbed grinding wheel.

In both such methods, particularly the latter, the operation is rapid and results in completely satisfactory beads. In both, however, there is the objection that a substantial amount of plastic material is removed from the cylindrical elongated plastic blank being formed into beads between such bead forming portions. Such removed material is, in effect, lost, and furthermore the grinding machine must do a considerable amount of work upon the plastic body in so removing such intermediate portions of the blank.

In the forming of the cheaper bead strings, as for example those used on the fringes of upholstery, the stringing of the beads is a major item in their ultimate cost. Thus, after the bead bodies are formed by conventional operations, the beads must be strung upon a thread, string, or wire. When such bead stringing operation is performed by hand, it is obvious that it is time consuming and that even with moderate labor costs it is expensive compared to the costs of other operations involved in forming the bead strings.

The present invention has as a general object the forming of an elongated body, particularly a body of revolution, and more particularly a multiple bead blank, such blank including bead forming portions connected by relatively thin interposed necks. The multiple bead blank so formed is useful in either of the two described grinding operations, that is, the step-by-step form-grinding operation disclosed in Patent No. 2,413,880, or the continuous grinding operation disclosed by Patent No. 2,486,750, in the latter operation the bead blank produced by the present invention being introduced into the continuous grinding machine in synchronism therewith, whereby the bead forming portions match with the grooves in the grinding wheel.

It is accordingly among the specific objects of the present invention to provide a novel method of and apparatus for the forming of the above indicated type of multiple bead blanks.

A further object of the invention resides in the provision of a novel apparatus comprising a plastic material extruder and a molding head, the head providing continuously traveling cavities, the travel of such cavities being synchronized with the driving of the extruder.

Yet more specifically, a further object of the invention lies in the provision of a novel apparatus including a plastic material extruding means and a molding head connected thereto and receiving material therefrom, the molding head including a plurality of parallel helically grooved rollers providing therebetween continuously traveling cavities into which the extruded material is fed, the rollers being so connected to the extruder and to each other that their rotation is synchronized with the driving of the extruder, the rollers further being mounted in a driven rotatable cage which travels around the axis of the extruded material received between the rollers, whereby such extruded material is formed into the above described multiple bead blank and is, during the process, subjected to substantially no torque around its axis.

Subsidiary to such broad invention, the invention has as an object of the embodiment thereof first to be described the provision of a novel apparatus and method for the continuous forming of a pierced multiple bead blank which may subsequently be formed into separate beads as by grinding.

The invention has as an object of an embodiment which will be secondly described the provision of a novel apparatus and method for the forming of pre-strung multiple bead blanks, the bead blanks in such string being adapted for ready separation and finishing, while still remaining strung.

These and further objects of the invention will be more readily apparent upon consideration of preferred embodiments of the apparatus and method of the invention described herein.

In the drawings accompanying the specification, and forming a part thereof:

Fig. 1 is a view in plan of a preferred embodiment of the apparatus of the first described species of the invention;

Fig. 2 is a view in side elevation of the apparatus shown in Fig. 1;

Fig. 3 is a fragmentary view in side elevation of a multiple bead blank formed by the apparatus depicted in Figs. 1, 2, 5, 6, and 7;

Fig. 4 is a fragmentary view in side elevation of a multiple pre-strung bead blank formed by the apparatus of the second embodiment which is shown in Figs. 8, 9, and 10;

Fig. 5 is a fragmentary view in longitudinal section of the apparatus shown in Figs. 1 and 2, such section being taken in the vicinity of the molding head and being taken along the line 5—5 in Fig. 7;

Fig. 6 is an enlarged view in longitudinal section taken along the same line as that in Fig. 5 and in the vicinity of the entering end of the helically grooved forming rolls;

Fig. 7 is an end view of the apparatus shown in Fig. 5, the view being taken from a point of view along line 7—7 in Fig. 5;

Fig. 8 is a view in plan of a preferred embodiment of the apparatus made in accordance with the second embodiment thereof;

Fig. 9 is a view in horizontal section through the molding head end of such apparatus, such section being taken along the line 9—9 in Fig. 10; and Fig. 10 is a view in end elevation of the apparatus of Figs. 8 and 9, the view being taken from a point of view along the line 10—10 in Fig. 8.

Although the multiple blanks which are described and shown as being formed by the apparatus and method of the described preferred embodiments are denominated "multiple bead blanks," it is obvious that various bodies of other shapes may advantageously be formed by the method and apparatus of the present invention. Among such other shapes are cylindrical bodies, or generally cylindrical bodies having pointed or otherwise shaped ends, as are indicated in Patent No. 2,486,750.

In the apparatus of the first described embodiment, shown in Figs. 1, 2, 5, 6, and 7, there is employed a conventional extruding machine designated 2, such extruder being for example, of the type known as the John Royle, Model No. 3. Such extrusion device has an extrusion barrel, designated 4, within which is contained the conventional stock screw 10. Barrel 4 is supported by the mount 6, such mount resting upon the base 8 which supports the extruding machine and the motor 18, as shown. The stock screw 10 rotates about its axis, being driven by means of a worm and worm gear set contained in the gear case 12. The worm is connected to the horizontal drive shaft 14, which is driven by motor 18 through the medium of the multiple V belt receiving sheave 22, keyed to the motor shaft, and sheave 16 keyed to shaft 14, such sheaves being connected by the multiple V belts 20.

Barrel 4 of the extrusion machine is made up of a plurality of sections 24, 26, and 28, the first such section, 24, including the hopper opening 32. Plastic material received in such hopper opening is engaged by the stock screw and is progressively plasticized and caused to travel to the left of the apparatus, as such apparatus is shown in Figs. 1 and 2. Each of section 24, 26, and 28, as is conventional in the art, is provided with a fluid heat exchange medium receiving chamber or chambers surrounding the inner lining of the barrel, such heat exchange medium being introduced into the chambers through a pipe at one end thereof, as shown, and exhausted from such chambers by a pipe at the other end thereof. In this instance, since the bead blanks are preferably to be formed of a thermoplastic material such as cellulose acetate or ethylcellulose, such heat exchange medium receiving chambers are provided, from a source not shown, with heated oil under pressure. A representative heat exchanging medium receiving chamber is shown at 34 in the end barrel section 28, such chamber being supplied with hot oil through the inlet pipe 36, as shown in Fig. 5. Each of the barrel sections of the extruding barrel is provided with a hard liner, a typical hard liner being shown at 38 in barrel section 28. The stock screw of the extrusion machine is preferably cooled in a conventional manner, the liquid coolant being introduced into the hollow stock screw through the pipe 40 into the fitting 41, and thence longitudinally of the stock screw. The coolant is exhausted from such stock screw through the pipe 42, shown in Fig. 1, connection between fitting 41 and the stock screw being effected through the conventional pressure type rotary joint 44.

The molding head 30 is connected, as shown, with flange 48 at the rear end thereof in abutment with the flange 46 at the forward end of the barrel portion 28. The head 30 is connected to the part 28 by means of studs, shown more clearly in Fig. 5. The rear end of the molding head, designated 50, has a bore 52 therein which, as shown, is coaxial with the bore of the extrusion barrel, bore 52 receiving the plastic material 56 forwarded by the stock screw 10. In some instances, particularly with those plastics requiring the higher working temperatures, it is necessary to add heat to the plastic material 56 contained within bore 52. There are provided within body 50 a plurality of resistance heating elements, in this instance shown as "Calrod" elements 54 disposed within horizontal and vertical bores in body 50. Such Calrod elements may be controlled by conventional thermostatic means, not shown, whereby the plastic material 56 may be maintained at the desired temperature.

Molding head 30 has forwardly of the described portion 50 a front cylindrical shell-like barrel portion designated 58. Barrel 58 has within it a cylindrical bearing surface 60. Between barrel 58 and the rear portion 50 of the molding head there is a transverse rear wall 62 which has the central opening 64 therethrough. Within the barrel 58 there is rotatably disposed a cage structure, generally designated 66. Such cage structure supports within it the two rotatable helically grooved forming rolls 76 and 78 for the plastic material 56 which proceeds from chamber 52 into the molding head. The cage structure has an intermediate portion, as shown, such intermediate portion having at the top, as the device is shown in Fig. 5, a relatively thin wall 70 and at the bottom a thickened portion 68.

Integrally connected to such intermediate wall portions of the cage is the rear transverse wall forming portion 72. Wall 72 has provided centrally thereof the openings 65 which is of the same size as, and which communicates with, the previously described aperture 64. The front end of the rotatable cage is made up by the removable roll supporting and retaining member 74. Member 74 is rigidly connected to the central portion of the cage by means of the stud members 75, shown in Fig. 7. A ring gear 86 is fixedly and non-rotatably mounted upon the front of the barrel portion 58 by the retaining annulus 80. Annulus 80 is attached to the flange 84 on the forward outer portion of the barrel 58 by means of studs 82, shown in Figs. 5 and 7.

Forming roll 76, shown at the top in Fig. 5, is provided with a forward roll neck 92 and a rear roll neck 94. Lower forming roll 78 is similarly provided with a forward roll neck 96 and a rear roll neck 98. Each of the forming rolls is provided with a bore longitudinally therethrough for the reception of temperature controlling liquid. The bore in roll 76 is designated 100 and the bore in roll 78 is designated 102. Temperature controlling fluid is fed into such bores in the forming rolls and exhausted therefrom in the following manner. The bore 104 is provided radially of the molding head in the forward end thereof, as shown in Fig. 5. An annular groove 114 is provided on the outer wall of the rotatable cage 66 at the forward end thereof in mating relationship with the inner end of the passage 104. From such annular groove there extend two radially disposed passages in the forward end of the cage structure, one such passage, 106, connecting groove 114 with the bearing in member 74 in which is journaled the forward roll neck 92 of roll 76. A similar passage, 112, extends from groove 114 at the bottom of the cage, as shown, to the journal bearing in member 74 receiving roll neck 96. Bores transverse to the axes of the rolls are provided in the roll necks in mating relationship with the passages 106 and 112, whereby periodically upon their rotation the axial bores through the rolls are in communication with the passage 104.

The temperature exchange fluid in such longitudinal bores in the rolls is exhausted therefrom in a similar manner. An annular groove 118 is provided on the cage at the rear end thereof, as shown. Communicating with such annular groove are the two radial bores 108 and 116 in the rear end wall 72 of the cage. The inner ends of such bores 108 and 116 communicate with the exhaust end of the axial bores in the rolls. At the top of the molding head there is provided the exhaust passage 110 in communication with the annular groove 118.

In the molding of the thermoplastic resins such as cellulose acetate and ethylcellulose, a cooling medium such as cold water is circulated through the above described heat exchange system. The cooling medium is entered through the passage 104 and exhausted through passage 110, whereby the forming rolls 76 and 78 abstract heat from the plastic material being formed thereby into the elongated article such as a multiple blank.

To maintain sealing of the rotary joints which occur in the above described cooling system for the rolls, there are provided two sealing rings made for example of "Neoprene" or the like, such sealing rings being disposed one on each side of the rotary pressure joint at the roll neck. Such small sealing rings for the roll necks are designated 120. A seal is similarly effected between the inlet and exhaust bores through the molding head casing and the rotatable cage. One large sealing ring designated 122 is disposed in the cage structure on each side of the annular groove therein at both the forward and rear ends of the cage. The thin annular member 88, non-rotatably secured between ring gear 86 and the forward face of flange 84, retains the forward sealing ring 122 in place, as shown in Fig. 5.

As shown, the grooves on the two rolls are of the same hand and pitch. The structure of the molding head is such that the two similar helically grooved rolls 76 and 78 thereon, the axes of which lie parallel to the direction of delivery of the column of plastic material being shaped, are both driven in the same direction and are so synchronized that the lands remain in confronting relationship and the grooves thereon form continuously traveling laterally open mold cavities which progress in a direction away from the extrusion means. The forming rolls are carried on cage 66 which is positively rotated about the axis of the column of such material as it travels, whereby the plastic material being formed is subjected to substantially no torque during such forming process.

The forming rolls of the molding head and the cage thereof are driven in the following manner. The worm shaft 14 of the extruding machine is extended into the portion 124, as shown in Figs. 1 and 2. The outer end of shaft portion 124 carries a sprocket 128, such sprocket driving the input sprocket 130 of the conventional change speed mechanism 126 by means of the chain 132, which is entrained over sprockets 128 and 130. The change speed device 126 may, if desired, be of the infinitely variable type, such as the "Link Belt" change speed device employing two V pulleys so connected as to be reversely changeable in diameter, such pulleys being connected by a chain or belt of constant length.

Change speed device 126, which is preferably of the infinitely variable type adjusted by the hand wheel 134, delivers power therefrom through the bevel gear 136 which, as shown, is in mesh with a bevel gear 138 affixed to the rear end of the horizontal drive shaft 140. Shaft 140 is supported by fixed structure of the extrusion barrel and by lateral extension 148 on the forward end of the molding head. Shaft 140 carries adjacent its forward end a gear 142 which drives the cage 66 in the following manner.

As more clearly indicated in Figs. 5 and 7, the forward stationary portion of the molding head is provided in one location with the above mentioned extension 148, which carries journaled therewithin the forward end of shaft 140.

Also carried on extension 148 is the stub-shaft 150 keyed therein against rotation. Shaft 150 carries on its rear end the pinion gear 152 which runs in mesh with gear 142. Gear 152 is rotatably supported on the rear end of shaft 150 which is of reduced diameter, the gear being retained thereon by stud 154. Cage 66 is provided at substantially its longitudinal center with the annular gear 220 extending thereabout coaxially thereof, gear 220 being of such diameter as to lie inwardly of the peripheral bearing surface of the cage. At a location confronting gear 152 the barrel portion 58 is provided with a slot 222 receiving the rim of gear 152. Gear 152 runs, as shown in Figs. 5 and 7, in mesh with the gear 220 on the cage 66, so that rotation of shaft 140 effects positive rotation of cage 66 in the same direction. Thus the cage structure rotates in synchronism with the rotation of the extruding machine stock screw, the ratio between the speeds of rotation of the stock screw and the carriage being variable, as explained, by the speed change device 126.

As can be seen by considering Figs. 5 and 7, there is mounted on the forward end of the stud 90, which extends through the removable member 74 and is threaded into the cage portion 68, the pinion 156 which is constantly in mesh with the stationary ring gear 86 and with the gears 158 and 160, on the forward necks of rolls 76 and 78, respectively. Thus, when the cage member 66 of the molding head travels in a counter-clockwise direction, as indicated in Fig. 7, the two forming rolls 76 and 78 likewise are positively driven to rotate counter-clockwise. The result of such travel of the forming rolls is to cause the cavities formed by the mating semi-circular grooves aligned with the passages 64 and 65 progressively to travel to the left, as the device is shown in Fig. 5. At the same time the two rolls as a whole are positively rotated around the column of plastic material being formed, due to the driving of cage 66, thus eliminating any torque effects upon such column while shaping the material and cooling it. Additionally, due to the helical grooves in the rolls 76 and 78, the material thus being formed is pulled toward the left, where it emerges through the centrally disposed exit opening 121 in the forward removable member 74 in the form of a multiple bead blank, generally designated 163. Such bead blank is preferably received upon a driven endless conveyor, indicated at 176 in Figs. 1 and 2.

It is usually preferred, in the forming of bead blanks, to have such bead blanks pre-pierced so that drilling or piercing of the individual beads as a subsequent step is eliminated. In the embodiment shown, therefore, there is provided the elongated thin mandrel 168 in the form of a wire, such mandrel being supported between the rolls 76 and 78 by the mandrel bridge 170 disposed in the cavity 52. The multiple bead blank 163, shown more particularly in Fig. 3, thus slips progressively along the piercing mandrel 168. As shown in Fig. 3 such multiple bead blank consists of the partially formed bead portions 162 which are connected by the interposed neck portions 164. The bead forming portions 162, of course, result from the plastic material which has been forced into the laterally open cavities between the mating semi-circular helical grooves 172 of the rolls, 76 and 78, as shown more clearly in Fig. 6. The interposed connecting necks 164 result from the forming of the portion of the plastic column between bead blanks by the helical lands 174 interposed between the circular grooves 172 on the forming rolls.

It will be observed from Fig. 6 that the volume of the laterally open mold cavities into which the extruded plastic material is delivered is not constant, that is, the volume between confronting lands 174 of the forming rolls is less than that between confronting grooves 172 thereof. To maintain the desired synchronism between the molding head and the extrusion screw with such intermittently varying volume of the mold cavities, the diameter of the delivery passage 65 is made somewhat smaller than the diameter of the mold cavities defined by the grooves 172. The plastic material 56 in passage 65 is maintained in a plasticized condition, and thus under the pressures employed flows readily. The mold cavity at the entering ends of the rolls in which a bead blank 162 is initially formed remains open to the forward end of delivery passage 65 for an appreciable period of time. Although the passage 65 has a diameter less than the diameter of the bead forming portions of the rolls, there is sufficient time for such delivered column of plastic material to flow into and to fill the bead forming portion of the mold cavity. As a result, therefore, it is possible with the apparatus described to form a multiple blank in which intermediate sections are of markedly smaller diameter than the others, while maintaining synchronism between the speeds of driving of the extruding machine and the molding head, simply because of the time factor allowed in the travel of the mold cavity forming parts by which the larger cavities may be filled by the delivered stream of plastic material. Although the cavities between the rolls are laterally open, the chilling effect of such rolls on the plastic column taken in conjunction with the planetary motion of the rolls, prevents escape of plastic material sidewardly from the cavities.

As above explained, the second illustrative embodiment of the invention is designed for the production of prestrung bead blanks. One such bead forming bodies 180 are shown as connected by interposed neck portions 12. In such preferred embodiment, neck portions 182 as of much less diameter and are much shorter than the neck portions 164 of the bead blank formed by the first described embodiment of the apparatus. Multiple bead blank 178 has mounted or disposed therethrough the string or thin wire 184, upon which the beads formed from bodies 180 remain. The multiple blank 178 may be finished in a variety of ways, one of which is the tumbling of an appreciable length of such multiple bead blank in a drum. Such tumbling is sufficient to fracture the thin neck portions 182 and to effect a sufficient finishing of the confronting portions of the beads in the zones where such necks have been fractured.

In Figs. 8, 9, and 10 there is shown the second illustrative embodiment of the apparatus of the invention. The apparatus combines, in this instance, an extrusion device of the same type as that employed in the previously described embodiment, such extrusion device incorporating, however, a side delivery head to the delivery end of which is secured a bead blank molding head similar to that employed in the first embodiment. Portions of the extruding device which are similar to that previously described are designated by the same reference characters as those previously used, with an added prime.

To the forward end of the mold barrel portion 28' there is connected a conventional side delivery head, generally designated by the reference character 186. The forward transverse portion of head 186 is designated 188. The rear portion 190 of the hinged side delivery head is attached, as shown, to the forward flange of the extrusion barrel 28'. Such rear portion 190 is provided with the chamber 192 adapted to receive heat exchange fluid through inlet and exit pipes, not shown. Rear portion 190 and forward transverse portion 188 of the side delivery head are connected by the hinge device 194, the portions being secured together in operative position by means of the studs 196, the hinge holding the head parts together when the studs are removed, as during inspection of the stock screw and extrusion barrel.

Positioned in portion 188 of the side delivery head is the string or wire guiding sleeve 198, into the left-hand end of which, as it is shown in Fig. 9, is introduced the wire or string 184. The plastic material, proceeding from the extrusion barrel in which it is impelled by the stock screw 10', emerges into the primary chamber 200 from which it flows forwardly into the secondary chamber 202, at which latter point it flows around the string or wire 184. In the forward end of the portion 188 of the side delivery there is located the threaded coaxial bore 206 in which is received the correspondingly threaded rearwardly projecting sleeve portion 204, of the molding head 30'. Such molding head is substantially identical with the molding head 30 previously described, and so it is not necessary to discuss it in detail. As in the case of molding head 30, the delivery passages, 64' and 65' in this instance, which deliver the plastic material to the forming rolls, are of less diameter than the larger of the mold cavities formed between the mating rolls. The thus delivered stream of plastic material, enclosing the string or wire 184, progresses through the forming rolls 76' and 78' the finally shaped multiple bead blank, prestrung as described, issuing at 178. Preferably such blank is caught on the endless driven belt conveyor 176', as indicated in Fig. 10. In molding head 30', as in molding head 30, heat is abstracted from the rolls by the axial bores therein through which is circulated cooling fluid such as water. As a result, the extruded plastic material, which in the case of materials such as ethylcellulose and cellulose acetate is thermoplastic, becomes fairly hard and self-sustaining, usually at a point about half way of its travel axially of the forming rolls. Thus the plastic material becomes sufficiently cool and strong for the rolls to exert a marked axial pull thereon, such pull aiding travel of the multiple blank through the molding head while being insufficient to fracture such multiple blank at the smaller interposed necks 182 between the bead forming parts. Rolls 76' and 78', of course, have the lands thereon of such radial height, and the roll centers are so spaced as to form such thinner, smaller, necks.

The driving of the molding head from the driven shaft 14' of the extruding machine is effected in essentially the same way as in the first-described embodiment. The speed change mechanism 126' is driven from the end 124' of the driven shaft by means of chain 132', as shown. In this case, however, the drive to the molding head is somewhat simpler, since the axis of the cage in the molding head lies parallel with the output shaft of the speed change device. The molding head is provided at the forward end thereof with an extension in the form of a sleeve 224 in which is journaled the shaft 226 which carries on its forward end the sprocket 196'. On its rear end shaft 226 carries the pinion 142', which meshes with the intermediate pinion 152' mounted on the molding head in the same manner as gear 152 in the first described embodiment of the apparatus. Gear 152' meshes, through a slot in the barrel wall, with the annular gear 220', shown in Fig. 9, in the periphery of the wall of cage 66'. The molding head sprocket 196' is driven by a chain 210, which extends over sprocket 146' and over the delivery sprocket 208 on the change speed device. The wire or string 184 is delivered from a source of supply, generally shown as a bobbin 212, the member 184 traveling between side guides 214 over the guide sheave 216 and into the sleeve 198 of the side delivery head of the extruding machine 2', as shown.

Whereas for purposes of illustration I have shown and described preferred embodiments of the method and apparatus for forming elongated multiple blanks, particularly multiple bead blanks, of my invention, it will be understood that, within its broader aspects, the invention is capable of considerable variation as to details. Accordingly the invention is to be defined by the scope of the claims appended hereto.

I claim as new the following:

1. The method of forming elongated shaped articles from plastic material, said articles having a plurality of similar enlarged portions equally spaced therealong, said enlarged portions being spaced by interposed similar neck portions of less diameter than the enlarged portions, which comprises extruding the plastic material into a column, feeding such column along its axis, simultaneously compressing and shaping the column in a plurality of annular zones around the axis of the column as it travels, each zone so shaped being briefly and repeatedly compressed in direction which are normal thereto over the extent of such zone, instantaneous compression of such zone being at areas spaced appreciably angularly from each other about the axis of the column, such areas extending generally longitudinally of the article, the areas of compression of such zone travelling regularly around such zone, said compressed and shaped annular zones forming the spaced necks of the article.

2. The method of forming elongated shaped articles which are bodies of revolution from thermoplastic material, said articles having a plurality of similar enlarged portions equally spaced therealong, said enlarged portions being spaced by interposed similar neck portions of less diameter than the enlarged portions, which comprises heating said thermoplastic material and extruding it in heated plastic condition into a column, feeding such column along its axis, simultaneously compressing and shaping the column in a plurality of annular zones around the axis of the column as it travels, each zone so shaped being briefly and repeatedly compressed in directions which are normal thereto over the extent of such zone, instantaneous compression of such zone being at areas spaced appreciably angularly from each other about the axis of the column, such areas extending generally longitudinally of the article, the areas of compression of such zone travelling regularly around such zone, said compressed and shaped annular zones forming the spaced necks of the article, and progressively cooling the column during such compressing and shaping steps.

3. The method of forming elongated shaped articles from plastic material, said articles having a plurality of similar enlarged portions equally spaced therealong, said enlarged portions being spaced by interposed similar neck portions of less diameter than the enlarged portions, which comprises extruding said plastic material into a column, feeding such column along its axis under pressure, continuing such feeding of the column under pressure into a molding means, in such molding means simultaneously compressing and shaping the column to reduce its diameter in a plurality of first annular zones around the axis of the column as it travels, and to increase its diameter in second annular zones intermediate said first named zone, each first and second zone so shaped being briefly and repeatedly compressed in directions which are normal to the surface of the column over the extent of such zone, instantaneous compression of such zone being at areas on the column spaced appreciably angularly from each other about the axis of the column, such areas extending generally longitudinally of the article, the areas of compression of such zone travelling regularly around such zone, said first shaped annular zones forming the spaced necks of the article.

4. The method of forming elongated shaped articles which are bodies of revolution from thermoplastic material, said articles having a plurality of similar enlarged portions equally spaced therealong, said enlarged portions being spaced by interposed similar neck portions of less diameter than the enlarged portions, which comprises heating said thermoplastic material and extruding it in heated plastic condition into a column, feeding such column along its axis under pressure, continuing such feeding of the column under pressure into a molding means, in such molding means simultaneously compressing and shaping the column to reduce its diameter in a plurality of first annular zones around the axis of the column as it travels, and to increase its diameter in second annular zones intermediate said first named zones, each first and second zone so shaped being briefly and repeatedly compressed in directions which are normal to the surface of the column over the extent of such zone, instantaneous compression of such zone being at areas on the column spaced appreciably angularly from each other about the axis of the column, such areas extending generally longitudinally of the article, the areas of compression of such zone travelling regularly around such zone, said first shaped annular zones forming the spaced necks of the article, and progressively cooling the column during such compressing and shaping steps.

5. The method of forming elongated shaped articles which are bodies of revolution from thermoplastic material, said articles having a plurality of similar enlarged portions equally spaced therealong, said enlarged portions being spaced by interposed similar neck portions of less diameter than the enlarged portions, which comprises heating said thermoplastic material and extruding it in heated plastic condition into a column, feeding such column along its axis under pressure, continuing such feeding of the column under pressure into a molding means, in such molding means simultaneously compressing and shaping the column to reduce its diameter in a plurality of first annular zones around the axis of the column as it travels, and to increase its diameter in second annular zones intermediate said first named zones, each first and second zone so shaped being briefly and repeatedly compressed in directions which are normal to the surface of the column over the extent of such zone, instantaneous compression of such zone being at areas on the column spaced appreciably angularly from each other about the axis of the column, such areas extending generally longitudinally of the article, the areas of compression of such zone travelling regularly around such zone, said first shaped annular zones forming the spaced necks of the article, and progressively cooling the column during such compressing and shaping steps, during the recited compressing and shaping steps subjecting the column of plastic material being shaped to a force along its axis to forward it away from the extrusion zone.

6. The method of forming elongated shaped articles which are bodies of revolution from thermoplastic material, said articles having a plurality of similar enlarged portions equally spaced therealong, said enlarged portions being spaced by interposed similar neck portions of less diameter than the enlarged portions, which comprises heating said thermoplastic material and extruding it in heated plastic condition into a column, feeding such column along its axis under pressure, continuing such feeding of the column under pressure into a molding means, in such molding means simultaneously compressing and shaping the column to reduce its diameter in a plurality of annular zones around the axis of the column as it travels, thereby forming said neck portions, and shaping the column to increase its diameter in the annular zones intermediate said first named zones thereby forming said enlarged portions, each neck and enlarged portion so shaped being briefly and repeatedly compressed in directions which are normal to the surface of the column over the extent of such portion, instantaneous compression of each such portion being at diametrically opposed areas on the column, such areas extending generally longitudinally of the article, the areas of compression of such portion traveling regularly around such portion, and progressively cooling the column during such compressing and shaping steps, during the recited compressing and shaping steps subjecting the column of plastic material being shaped to a force along its axis to forward it away from the extrusion zone, the speeds at which the column is extruded, compressed and shaped, and forwarded while being so compressed and shaped being synchronized, whereby the enlarged portions of the article are fully filled out and the forwarding pull imparted to the article in the zone of compression and shaping aids the extrusion pressure in causing travel of the finally shaped elongated article.

7. The method of forming elongated shaped articles which are hollow bodies of revolution from thermoplastic material, said articles having a plurality of similar enlarged portions equally spaced therealong, said enlarged portions being spaced by interposed similar neck portions of less diameter than the enlarged portions, which comprises heating said thermoplastic material and extruding it in heated plastic condition into a hollow column, feeding such column along its axis, simultaneously compressing and shaping the column in a plurality of annular zones around the axis of the column as it travels, each zone so shaped being briefly and repeatedly compressed in directions which are normal thereto over the extent of such zone, instantaneous compression of such zone being at areas spaced appreciably from each other about the axis of the column, such areas extending generally longitudinally of the article, the areas of compression of such zone travelling regularly around such zone, said shaped annular zones forming the spaced necks of the article, and progressively cooling the column during such compressing and shaping steps.

8. The method of forming elongated shaped articles which are bodies of revolution from thermoplastic material, said articles having an elongated cord or the like disposed axially therein and having a plurality of similar enlarged portions equally spaced therealong, said enlarged portions being spaced by interposed similar neck portions of less diameter than the enlarged portions, which comprises heating said thermoplastic material and extruding it in heated plastic condition into a column, feeding the cord or the like into such column so that it lies axially thereof, feeding such column along its axis, simultaneously compressing and shaping the column in a plurality of annular zones around the axis of the column as it travels, each zone so shaped being briefly and repeatedly compressed in directions which are normal thereto over the extent of such zone, instantaneous compression of such zone being at areas spaced appreciably angularly from each other about the axis of the column, such areas extending generally longitudinally of the article, The areas of compression of such zone travelling regularly around such zone, said shaped annular zones forming the spaced necks of the article, and progressively cooling the column during such compressing and shaping steps.

9. Apparatus for forming elongated shaped articles from plastic material, said articles having a plurality of similar spaced enlarged portions equally spaced therealong, said enlarged portions being spaced by interposed neck portions of less diameter than said enlarged portions, which comprises an extrusion press, means for driving the extrusion press, said extrusion press having a delivery orifice such that it expresses the plastic material in the form of a substantially cylindrical column, means for forming the column of plastic material issuing from the delivery orifice, said forming means receiving the extruded column directly from the extrusion press, said forming means comprising a roll support mounted in line with the delivery orifice beyond the outer end thereof, a plurality of similar helically grooved forming rolls rotatably mounted in the roll support parallel to each other, the rolls being parallel with the line of delivery of the column and spaced to provide a longitudinal gap therebetween, the gap between the rolls being in line with said line of delivery of the column, the lands of the rolls being of the same hand and confronting each other at the gap between the rolls, the entrance ends of the rolls receiving the column of plastic material issuing from the delivery orifice, means for driving the rolls in the same direction and in synchronism with each other, and means for synchronizing the speeds of driving of the extrusion press and of the forming rolls, whereby the forming rolls form the column of plastic material and impel it toward the exit ends of the forming rolls.

10. Apparatus for forming elongated shaped articles from thermoplastic material, said articles being bodies of revolution, said articles having a plurality of similar spaced enlarged portions equally spaced therealong, said enlarged portions being spaced by interposed neck portions of less diameter than said enlarged portions, which comprises an extrusion press, means for driving the extrusion press, said extrusion press having a delivery orifice such that it expresses the plastic material in the form of a substantially cylindrical column, means for forming the column of plastic material issuing from the delivery orifice, said forming means being serially connected to the extrusion press and receiving the extruded column therefrom under pressure, said forming means comprising a roll support mounted in line with the delivery orifice beyond the outer end thereof, a plurality of similar helically grooved forming rolls rotatably mounted in the roll support parallel to each other, the rolls being parallel with the line of delivery of the column and spaced to provide a longitudinal gap therebetween, the gap between the rolls being in line with said line of delivery of the column, the lands of the rolls being of the same hand and confronting each other at the gap between the rolls, the entrance ends of the rolls being in immediate communication with the exit end of the delivery orifice, means for driving the rolls in the same direction and in synchronism with each other, means for synchronizing the speeds of driving of the extrusion press and of the forming rolls, whereby the forming rolls form the column of plastic material and impel it toward the exit ends of the forming rolls, means to heat the plastic material in the extrusion press, and means to cool the column of plastic material as it passes through the forming means.

11. Apparatus for forming elongated shaped articles from plastic material, said articles being bodies of revolution, said articles having a plurality of similar spaced enlarged annular portions equally spaced therealong, said enlarged portions being spaced by interposed annular neck portions of less diameter than said enlarged portions, which comprises an extrusion press, means for driving the extrusion press, said extrusion press having a delivery orifice such that it expresses the plastic material in the form of a substantially cylindrical column, means for forming the column of plastic material issuing from the delivery orifice, said forming means being serially connected to the extrusion press and receiving the extruded column therefrom under pressure, said forming means comprising a supporting barrel mounted in line with the delivery orifice beyond the outer end thereof, a cage rotatably mounted in the barrel, the axis of rotation of the cage being parallel with the line along which the column of plastic material issues from the orifice, a plurality of similar helically grooved forming rolls rotatably mounted in the cage parallel to each other, the rolls being parallel with the line of delivery of the column and spaced to provide a longitudinal gap therebetween, the gap between the rolls being in line with said line of delivery of the column, the lands of the rolls being of the same hand and confronting each other at the gap between the rolls, the entrance ends of the rolls being in immediate communication with the exit end of the delivery orifice, means for driving the rolls in the same direction and in synchronism with each other, means for rotating said cage and contained rolls as a unit about the longitudinal center-line of the gap between the rolls in the same direction as the forming rolls, and means for synchronizing the speeds of driving of the extrusion press, the forming rolls, and the cage, whereby the forming rolls roll about the formed column of plastic material and impel it toward the exit ends of the forming rolls.

12. Apparatus for forming elongated shaped articles from thermoplastic material, said articles being bodies of revolution, said articles having a plurality of similar spaced enlarged annular portions equally spaced therealong, said enlarged portions being spaced by interposed annular neck portions of less diameter than said enlarged portions, which comprises an extrusion press, means for driving the extrusion press, said extrusion press having a delivery orifice such that it expresses the plastic material in the form of a substantially cylindrical column, means for forming the column of plastic material issuing from the delivery orifice, said forming means being serially connected to the extrusion press and receiving the extruded column therefrom under pressure, said forming means comprising a supporting barrel mounted in line with the delivery orifice beyond the outer end thereof, a cage rotatably mounted in the barrel, the axis of rotation of the cage being parallel with the line along which the column of plastic material issues from the orifice, a plurality of similar helically grooved forming rolls rotatably mounted in the cage parallel to each other, the rolls being parallel with the line of delivery of the column and spaced to provide a longitudinal gap therebetween, the gap between the rolls being in line with said line of delivery of the column, the lands of the rolls being of the same hand and confronting each other at the gap between the rolls, the entrance ends of the rolls being in immediate communication with the exit end of the delivery orifice, means for driving the rolls in the same direction and in synchronism with each other, means for rotating said cage and contained rolls as a unit about the longitudinal center-line of the gap between the rolls in the same direction as the forming rolls, and means for synchronizing the speeds of driving of the extrusion press, the forming rolls, and the cage, whereby the forming rolls roll about the formed column of plastic material and impel it toward the exit ends of the forming rolls, means to heat the plastic material in the extrusion press, and means to cool the column of plastic material as it passes through the forming means.

13. Apparatus for forming elongated shaped articles from thermoplastic material, said articles being bodies of revolution, said articles having a plurality of similar spaced enlarged annular portions equally spaced therealong, said enlarged portions being spaced by interposed annular neck portions of less diameter than said enlarged portions, which comprises an extrusion press, means for driving the extrusion press, said extrusion press having a delivery orifice such that it expresses the plastic material in the form of a substantially cylindrical column, means for forming the column of plastic material issuing from the delivery orifice, said forming means being serially connected to the extrusion press and receiving the extruded column therefrom under pressure, said forming means comprising a supporting barrel mounted in line with the delivery orifice beyond the outer end thereof, a cage rotatably mounted in the barrel, the axis of rotation of the cage being parallel with the line along which the column of plastic material issues from the orifice, a plurality of similar helically grooved forming rolls rotatably mounted in the cage parallel to each other, the rolls being parallel with the line of delivery of the column and spaced to provide a longitudinal gap therebetween, the gap between the rolls being in line with said line of delivery of the column, the lands of the rolls being of the same hand and confronting each other at the gap between the rolls, the entrance ends of the rolls being in immediate communication with the exit end of the delivery orifice, means for driving the rolls in the same direction and in synchronism with each other, means for rotating said cage and contained rolls as a unit about the longitudinal centerline of the gap between the rolls in the same direction as the forming rolls, and means for synchronizing the speeds of driving of the extrusion press, the forming rolls, and the cage, whereby the forming rolls roll about the formed column of plastic material and impel it toward the exit ends of the forming rolls, means to heat the plastic material in the extrusion press, and means to cool the column of plastic material as it passes through the forming means, the means for synchronizing the speeds of driving of the extrusion press, the forming rolls, and the cage comprising an annular internal gear fixedly mounted on the forward end of the supporting barrel coaxially therewith, a driving connection from the driving means for the extrusion press to the cage, a pinion on the end of each of the forming rolls in the vicinity of the internal gear, and an interposed pinion supported on the cage on an axis parallel with the rolls, said interposed pinion being in mesh with the internal gear and the pinions on the rolls.

14. Apparatus for forming elongated shaped articles from thermoplastic material, said articles being bodies of revolution, said articles having a plurality of similar spaced enlarged portions equally spaced therealong, said enlarged portions being spaced by interposed neck portions of less diameter than said enlarged portions, which comprises an extrusion press, means for driving the extrusion press, said extrusion press having a delivery orifice such that it expresses the plastic material in the form of a substantially cylindrical column, means for forming the column of plastic material issuing from the delivery orifice, said forming means being serially connected to the extrusion press and receiving the extruded column therefrom under pressure, said forming means comprising a supporting barrel mounted in line with the delivery orifice beyond the outer end thereof, a cage rotatably mounted in the barrel, the axis of rotation of the cage being parallel with the line along which the column of plastic material issues from the orifice, two similar helically grooved forming rolls rotatably mounted in the cage parallel to each other, the rolls being parallel with the line of delivery of the column and spaced to provide a longitudinal gap therebetween, the gap between the rolls being in line with said line of delivery of the column, the lands of the rolls being of the same hand and confronting each other at the gap between the rolls, the entrance ends of the rolls being in immediate communication with the exit end of the delivery orifice, means for driving the rolls in the same direction and in synchronism with each other, means for rotating said cage and contained rolls as a unit about the longitudinal center-line of the gap between the rolls in the same direction as the forming rolls, and means for synchronizing the speeds of driving of the extrusion press, the forming rolls, and the cage, whereby the forming rolls roll about the formed column of plastic material and impel it toward the exit ends of the forming rolls, means to heat the plastic material in the extrusion press, and means to cool the column of plastic material as it passes through the forming means, the means for synchronizing the speeds of driving of the extrusion press, the forming rolls, and the cage comprising a change speed mechanism driven by the driving means for the extrusion press, an annular internal gear fixedly mounted on the forward end of the supporting barrel coaxially therewith, a driving connection from the output end of the change speed mechanism to the cage, a pinion on the end of each of the two forming rolls in the vicinity of the internal gear, a third pinion supported on the cage on an axis parallel with the rolls, said interposed pinion being in mesh with the internal gear and the pinions on the rolls, said means for cooling the column of plastic material comprising axially extending coolant receiving chambers in the forming rolls, and means in the barrel and cage to introduce coolant into said chambers in the rolls and to exhaust it therefrom.

15. Apparatus for forming elongated shaped articles from thermoplastic material, said articles being bodies of revolution, said articles having a plurality of similar spaced enlarged portions equally spaced therealong, said enlarged portions being spaced by interposed neck portions of less diameter than said enlarged portions, the elongated shaped article having a generally axial passage therethrough, which comprises means for heating the plastic material, means for extruding such heated plastic material into a hollow column, means for feeding such hollow column along its axis, means for simultaneously compressing and shaping the column in a plurality of annular zones around the axis of the column as it travels, the last named means being so constructed and arranged that it briefly and repeatedly compresses the column in directions which are normal thereto over the extent of each such zone, such means further being so constructed and arranged that such instantaneous compression of such zone is at areas spaced appreciably angularly from each other about the axis of the column and extending generally longitudinally of the article, means for causing the compressing and shaping means to travel with respect to the column being shaped so that the areas of compression travel regularly around each such zone being shaped, and means for progressively cooling the column during such compression and shaping operations.

16. Apparatus for forming elongated shaped articles from thermoplastic material, said articles being bodies of revolution, said articles having a plurality of similar spaced enlarged portions equally spaced therealong, said enlarged portions being spaced by interposed neck portions of less diameter than said enlarged portions, the elongated shaped article having an elongated cord or the like disposed axially therein, which comprises means for heating the plastic material, means for extruding such heated plastic material into a column, means for feeding the cord or the like into such column so that it lies axially thereof, means for feeding such cord containing column along its axis, means for simultaneously compressing and shaping the column in a plurality of annular zones around the axis of the column as it travels, the last named means being so constructed and arranged that it briefly and repeatedly compresses the column in directions which are normal thereto over the extent of each such zone, such means further being so constructed and arranged that such instantaneous compression of such zone is at areas spaced appreciably angularly from each other about the axis of the column and extending generally longitudinally of the article, means for causing the compressing and shaping means to travel with respect to the column being shaped so that the areas of compression travel regularly around each such zone being shaped, and means for progressively cooling the column during such compression and shaping operations.

17. The method of forming elongated shaped articles from plastic material, said articles having a plurality of similar enlarged portions equally spaced therealong, said enlarged portions being spaced by interposed similar neck portions of less diameter than the enlarged portions, which comprises extruding the plastic material into a column, feeding such column along its axis, simultaneously compressing and shaping the column in a plurality of annular zones around the axis of the column as it travels, each zone so shaped being briefly and repeatedly compressed in directions which are normal thereto over the extent of such zone, instantaneous compression of such zone being at areas spaced appreciably angularly from each other about the axis of the column, such areas extending generally longitudinally of the article, the areas of compression of such zone travelling regularly around such zone, said compressed and shaped annular zones forming the spaced necks of the article, during the recited compressing and shaping steps subjecting the column of plastic material being shaped to a force along its axis to forward it away from the extrusion zone.

18. The method of forming elongated shaped articles from plastic material, said articles having a plurality of similar enlarged portions equally spaced therealong, said enlarged portions being spaced by interposed similar neck portions of less diameter than the enlarged portions, which comprises extruding the plastic material into a column, feeding such column along its axis, simultaneously compressing and shaping the column in a plurality of annular zones around the axis of the column as it travels, each zone so shaped being briefly and repeatedly compressed in directions which are normal thereto over the extent of such zone, instantaneous compression of such zone being at areas spaced appreciably angularly from each other about the axis of the column, such areas extending generally longitudinally of the article, the areas of compression of such zone travelling regularly around such zone, said compressed and shaped annular zones forming the spaced necks of the article, during the recited compressing and shaping steps subjecting the column of plastic material being shaped to a force along its axis to forward it away from the extrusion zone, the speeds at which the column is extruded, compressed and shaped, and forwarded while being so compressed and shaped being synchronized, whereby the enlarged portions of the article are fully filled out and the forwarding pull imparted to the article in the zone of compression and shaping aids the extrusion pressure in causing travel of the finally shaped elongated article.

19. The method of forming elongated shaped articles which are hollow bodies of revolution from plastic material, said articles having a plurality of similar enlarged portions equally spaced therealong, said enlarged portions being spaced by interposed similar neck portions of less diameter than the enlarged portions, which comprises extruding said plastic material into a hollow column, feeding such column along its axis, simultaneously pressing and shaping the column in a plurality of annular zones around the axis of the column as it travels, each zone so shaped being briefly and repeatedly compressed in directions which are normal thereto over the extent of such zone, instantaneous compression of such zone being in areas spaced appreciably from each other about the axis of the column, such areas extending generally longitudinally of the article, the areas of compression of such zone travelling regularly around such zone, said shaped annular zones forming the spaced necks of the article.

20. The method of forming elongated shaped articles which are bodies of revolution from plastic material, said articles having an elongated cord or the like disposed axially therein and having a plurality of similar enlarged portions equally spaced therealong, said enlarged portions being spaced by interposed similar neck portions of less diameter than the enlarged portions, which comprises extruding said plastic material into a column, feeding the cord or the like into such column so that it lies axially thereof, feeding such column along its axis, simultaneously compressing and shaping the column in a plurality of annular zones around the axis of the column as it travels, each zone so shaped being briefly and repeatedly compressed in directions which are normal thereto over the extent of such zone, instantaneous compression of such zone being at areas spaced appreciably angularly from each other about the axis of the column, such areas extending generally longitudinally of the article, the areas of compression of such zone travelling regularly around such zone, said shaped annular zones forming the spaced necks of the article.

21. Apparatus for forming elongated shaped articles from plastic material, said articles being bodies of revolution, said articles having a plurality of similar spaced enlarged portions equally spaced therealong, said enlarged portions being spaced by interposed neck portions of less diameter than said enlarged portions, which comprises means for extruding such plastic material into a column, means for feeding such column along its axis, means for simultaneously compressing and shaping the column in a plurality of annular zones around the axis of the column as it travels, the last named means being so constructed and arranged that it briefly and repeatedly compresses the column in directions which are normal thereto over the extent of each such zone, such means further being so constructed and arranged that such instantaneous compression of such zone is at areas spaced appreciably angularly from each other about the axis of the column and extending generally longitudinally of the article, and means for causing the compressing and shaping means to travel with respect to the column being shaped so that the areas of compression travel regularly around each such zone being shaped.

22. Apparatus for forming elongated shaped articles from plastic material, said articles being bodies of revolution, said articles having a plurality of similar spaced enlarged portions equally spaced therealong, said enlarged portions being spaced by interposed neck portions of less diameter than said enlarged portions, the elongated shaped article having an elongated cord or the like disposed axially therein, which comprises means for extruding such plastic material into a column, means for feeding the cord or the like into such column so that it lies axially thereof, means for feeding such cord containing column along its axis, means for simultaneously compressing and shaping the column in a plurality of annular zones around the axis of the column as it travels, the last named means being so constructed and arranged that it briefly and repeatedly compresses the column in directions which are normal thereto over the extent of each such zone, such means further being so constructed and arranged that such instantaneous compression of such zone is at areas shaped appreciably angularly from each other about the axis of the column and extending generally longitudinally of the article, and means for causing the compressing and shaping means to travel with respect to the column being shaped so that the areas of compression travel regularly around each such zone being shaped.

ARTHUR C. MASON.

REFERENCES CITED

The following references are of record in the file of this patent:

UNITED STATES PATENTS

| Number | Name | Date |
|---|---|---|
| 1,164,718 | Hill | Dec. 21, 1915 |
| 1,189,662 | Canda | July 4, 1916 |
| 1,537,348 | Grossmann | May 12, 1925 |
| 1,654,647 | Heist | Jan. 3, 1928 |
| 2,335,294 | Meyer | Nov. 30, 1943 |

FOREIGN PATENTS

| Number | Country | Date |
|---|---|---|
| 639,474 | France | Mar. 10, 1928 |